Sept. 8, 1931.   J. SACHS   1,822,544
ELECTRIC CIRCUIT CONTROLLING APPLIANCE
Filed Feb. 25, 1927   3 Sheets-Sheet 1
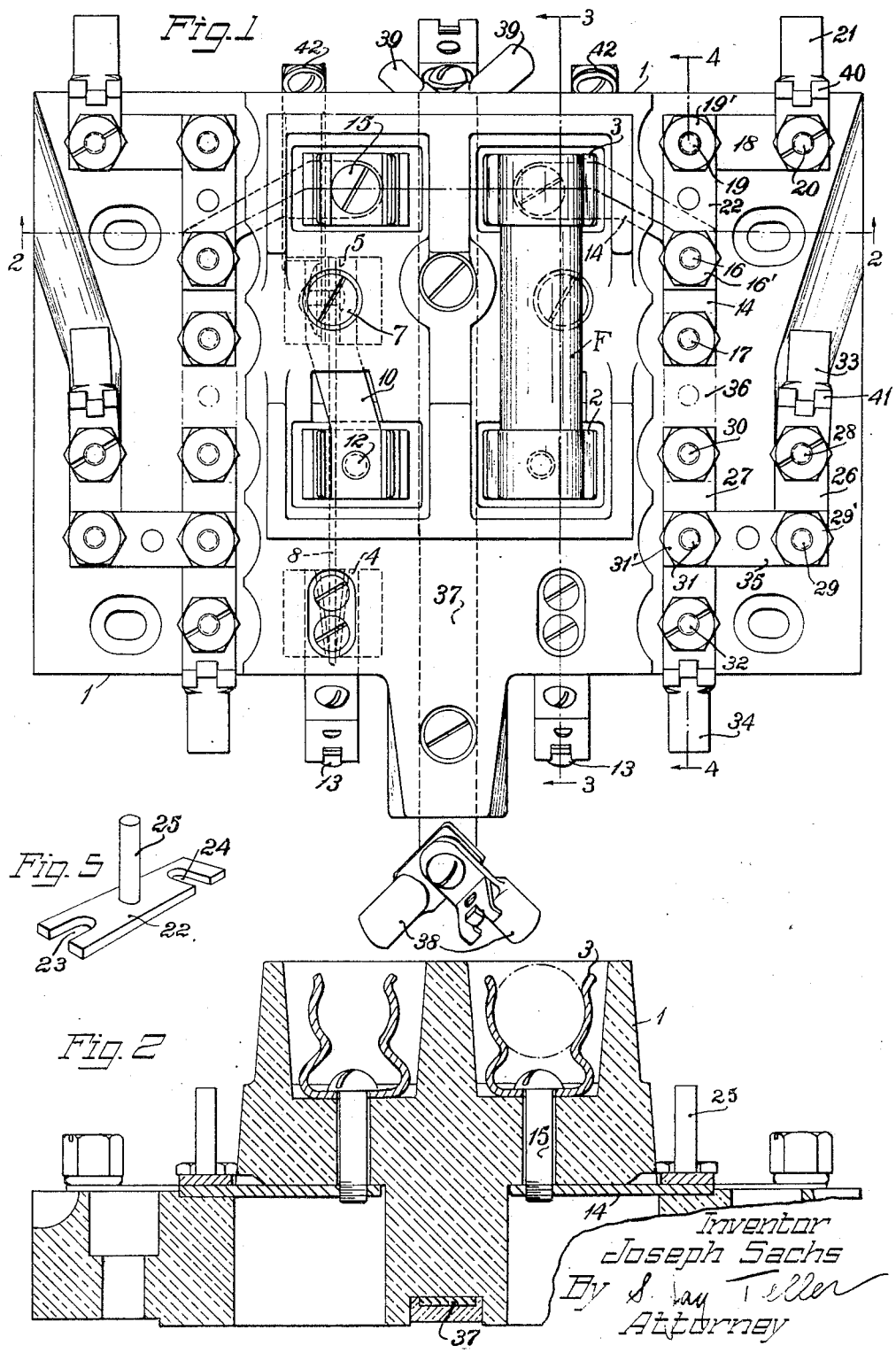

Sept. 8, 1931.   J. SACHS   1,822,544
ELECTRIC CIRCUIT CONTROLLING APPLIANCE
Filed Feb. 25, 1927   3 Sheets-Sheet 2
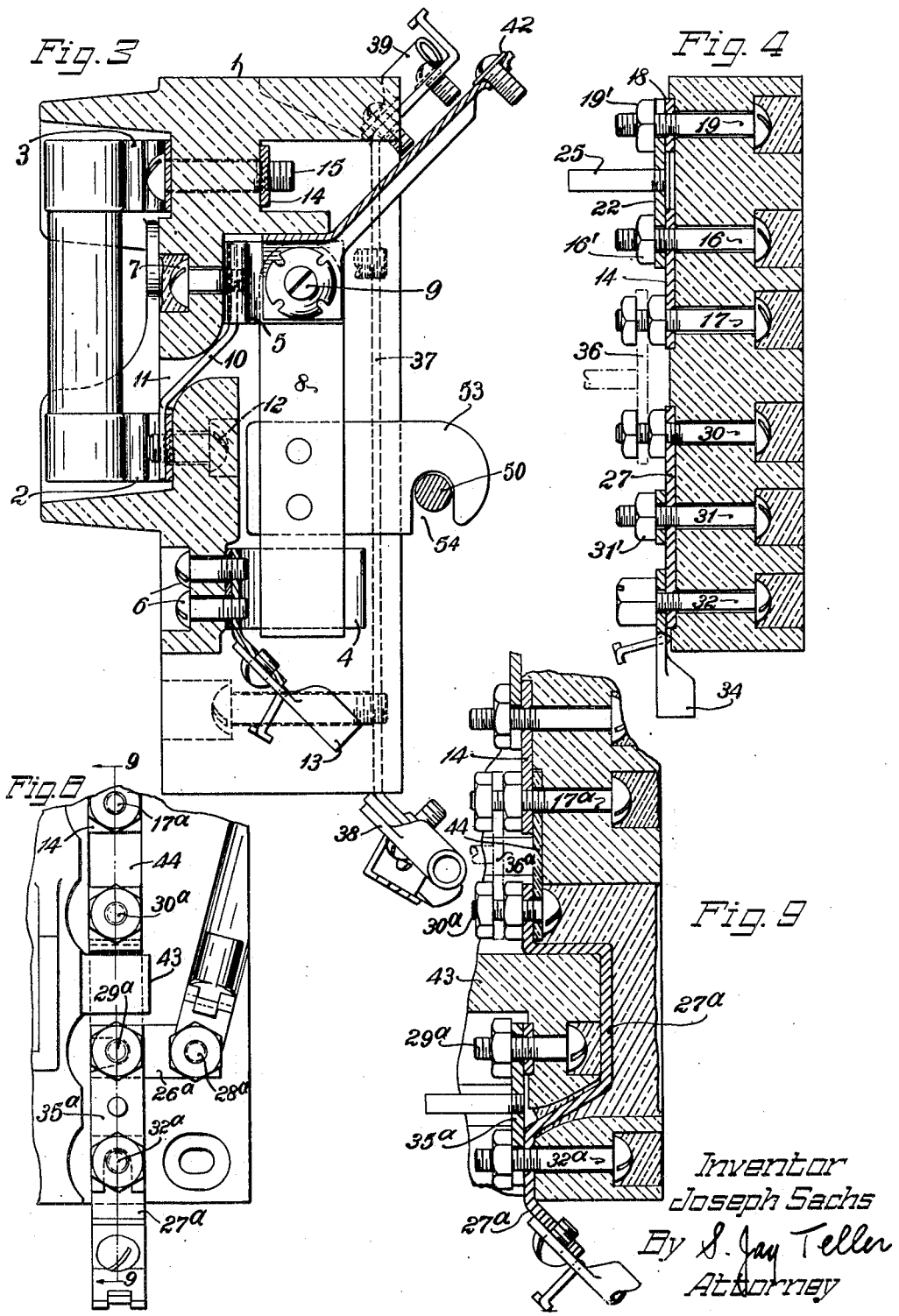

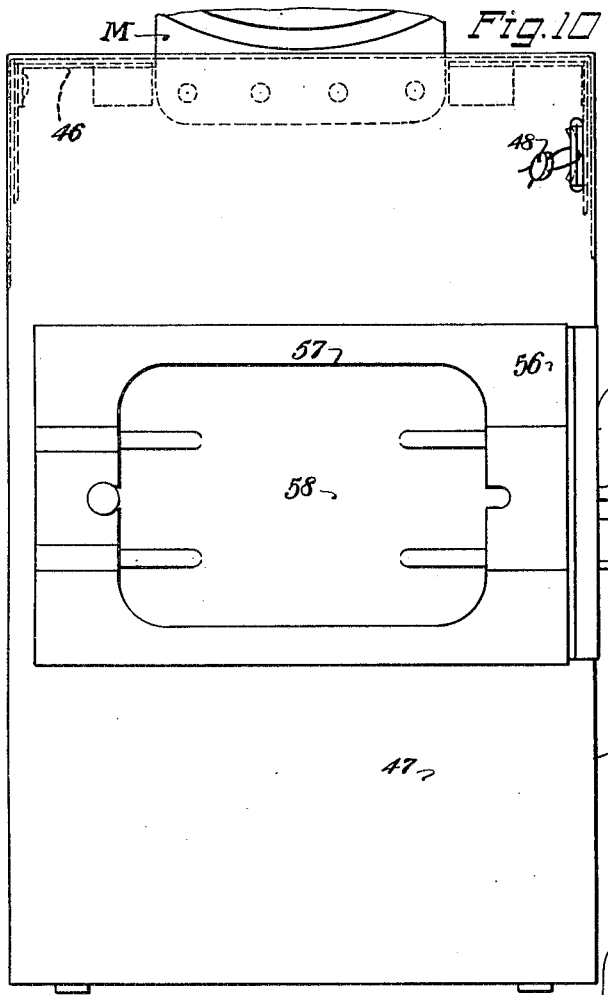
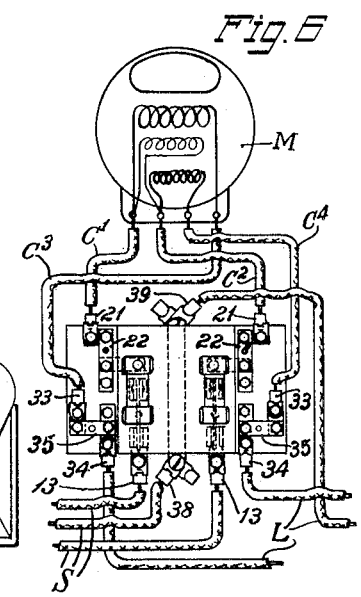
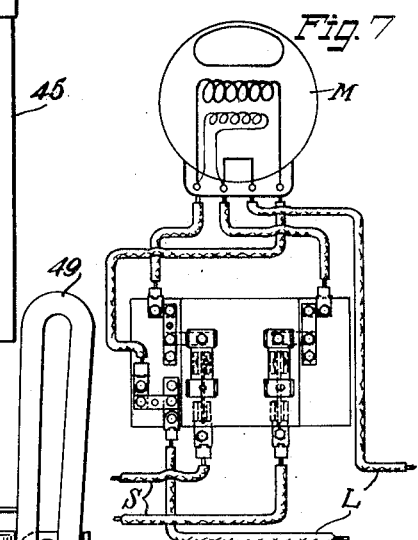
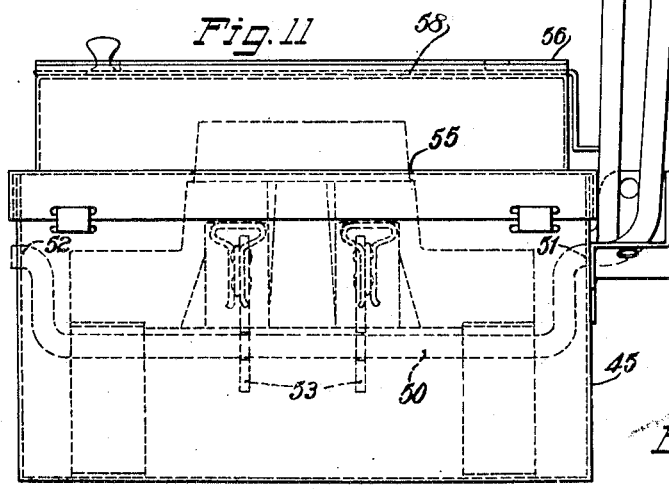

Patented Sept. 8, 1931

1,822,544

UNITED STATES PATENT OFFICE

JOSEPH SACHS, OF WEST HARTFORD, CONNECTICUT

ELECTRIC CIRCUIT CONTROLLING APPLIANCE

Application filed February 25, 1927. Serial No. 170,784.

An appliance of the type to which the present invention relates comprises a fused switch adapted to be used in association with an electric meter and also comprises meter testing facilities connected with the fused switch and adapted to be used for purposes of testing the meter. The appliance includes an insulating carrying means or base, fuse contacts being ordinarily mounted on the front face of the said carrying means. Switch contacts and associated parts are provided at the rear of the said carrying means and may be mounted directly thereon.

In accordance with the invention as set forth in my copending application for Electric meter service appliance, Serial No. 715,320, filed May 23, 1924, I have provided a novel arrangement of parts wherein the meter testing facilities are located at the front face of the carrying means or base and at the sides of those portions of the said front face which are occupied by the fuse contacts and by the wire terminals. The switch being located at the back of the carrying means or base does not interfere with the described relationship between the fuse contacts and the testing devices.

The construction shown in the aforesaid application includes a movable link or switch blade at the load side of the meter, the said switch serving when open to entirely disconnect the meter from the load wires, thus permitting the meter to be tested. The said construction also includes contacts connected with the circuit at the incoming or service side of the meter and also connected with the circuit at the load or outgoing side of the meter, the said contacts being adapted for the attachment of a temporary flexible connector or conductor serving to by-pass the meter and to permit the customer's current to remain uninterrupted while the meter is being tested.

A construction embodying the present invention is of the same general type as that already referred to and is shown in the said copending application. In accordance with the present invention, however, I not only provide a movable link or switch whereby the load side of the meter may be disconnected from the load wires, but I also provide another switch or link whereby the service side of the meter can be entirely disconnected from the service wires. These links are located at the respective sides of the fuses, thus retaining all of the advantages of the invention set forth in the before mentioned copending application.

Further in accordance with the present invention, I provide an improved and simplified arrangement of conductor parts at the sides of the fuses, these conductor parts at each side including two removable links serving respectively to disconnect the meter from the service and load wires and the said parts also including studs whereby another similar link may be temporarily attached for providing a direct by-pass connection without the use of the customary flexible conductors or connectors.

In the accompanying drawings, I have shown two embodiments of the invention, but it will be understood that these are intended for illustrative purposes only and are not intended to define or limit the scope of the invention, the claims forming a part of this specification being relied upon for that purpose.

Of the drawings:

Figure 1 is a front view of a meter testing fuse and switch block embodying the invention.

Fig. 2 is a sectional view taken along the line 2—2 of Fig. 1.

Fig. 3 is a vertical sectional view taken along the line 3—3 of Fig. 1.

Fig. 4 is a vertical sectional view taken along the line 4—4 of Fig. 1.

Fig. 5 is a detail perspective view of one of the removable connecting links.

Fig. 6 is a diagram showing the electrical connections for a three-wire circuit.

Fig. 7 is a diagram showing the electrical connections for a two-wire circuit.

Fig. 8 is a fragmentary front view similar to Fig. 1, but showing a somewhat different embodiment of the invention.

Fig. 9 is a fragmentary vertical sectional view taken along the line 9—9 of Fig. 8.

Fig. 10 is a front view of an enclosing box or cabinet for a switch and fuse block embodying the invention.

Fig. 11 is a bottom view of the box or cabinet shown in Fig. 10, this view also showing in dotted lines the general location of the block in the cabinet.

Referring to the drawings, 1 represents an insulating carrying means shown as being in the form of an integral base which is adapted to be suitably mounted in spaced relation with a rear supporting wall. The said wall may be and ordinarily is the rear wall of an enclosing box or cabinet such as will presently be described. The base 1 has a central fuse carrying portion provided with upper and lower edge faces. The base 1 is preferably symmetrical in form or approximately so and the parts carried thereby at opposite sides of the vertical central plane thereof are substantial duplicates of each other except for reversals of position. Accordingly for the sake of simplicity the description will, in the main, be confined to those parts at one side of the said plane, that is, those parts at the right hand side thereof.

There are two fuse contacts 2 and 3 carried by the base 1 at the front of the central fuse carrying portion thereof. These contacts are shown as adapted for receiving a fuse F of the cartridge enclosed type. It will be understood, however, that the invention is not limited to fuses of this type and that other forms of contacts may be provided for receiving other types of fuses.

At the back of the base 1 there is provided a switch which, so far as the present invention is concerned, may be widely varied as to its type and as to its manner of mounting. However, in order that one embodiment of the invention may be clearly disclosed, I have shown a switch of the knife-blade type directly mounted upon and carried by the base 1 at the rear face thereof. The switch comprises two contacts 4 and 5 connected directly to the base 1 by means of screws 6 and 7 respectively. A movable conducting switch blade 8 is pivotally mounted on one of the contacts 4 or 5, as for instance the contact 5, and is adapted to move into or out of engagement with the other contact as for instance the contact 4. I have shown the blade 8 as connected with the contact 5 by means of a pivot element 9 which is, or may be, of any usual construction.

The before mentioned fuse contacts and the before mentioned switches are adapted to be connected in series with an electric meter, but I do not limit myself as concerns the exact sequence of connections, as this may be varied widely without departing from the spirit of the present invention. However, I have shown the switch and fuse parts as adapted to be both connected ahead of the meter. In order that they may be so connected, I have provided a conductor 10 which extends directly between the switch contact 5 and the fuse contact 2, a suitable opening 11 being provided in the base 1 for receiving the said conductor 10. The said conductor is held by the screw 7 already referred to and by a screw 12 which also serves to hold the fuse contact 2 in place.

Adjacent at least one of the aforesaid edge faces of the central fuse carrying portion of the base is at least one wire receiving terminal connected with the said fuse contacts and the said switch. As already stated the details of connection may be varied, but as shown there is a terminal 13 adjacent the lower edge face and connected with the switch contact 4. This terminal 13 is adapted to be connected with one of the incoming service wires. It will be observed that the terminal 13 is at substantially the same distance from the central vertical plane of the block as are the fuse contacts and is in vertical register with the corresponding edge face of the base.

From the foregoing description, it will be understood that the fuse contact 2 is arranged to be connected indirectly through the switch with one of the incoming service wires. The other fuse contact 3 is adapted to be connected indirectly with the meter through parts now to be described. At each side of the central fuse carrying portion of the base is a surface adapted for the mounting of conductor parts constituting meter testing facilities. Preferably as shown most clearly in Fig. 2, the central fuse carrying portion of the base includes a forward projection for a purpose to be described. A conductor element 14 is provided which extends transversely and which at its inner end is connected by means of a screw 15 with the fuse contact 3, this screw also serving to hold the contact in place. The outer end of the conductor 14 extends vertically and is held by screws 16 and 17 which extend forward through the base and which have their inner ends projecting forward beyond the said conductor for a purpose to be described.

Also mounted at the front of the base and on the aforesaid side surface thereof is a conductor element 18 preferably extending transversely and held in place by screws 19 and 20 similar to the screws 16 and 17. Connected with the conductor element 18 and preferably held in place by the screw 20 is a wire receiving terminal 21 adapted to receive a wire connected with the meter at the service or incoming side thereof.

For connecting the two conductors 14 and 18, there is provided a removable link 22 which is shown in detail in Fig. 5. This link has apertures 23 and 24 adapted respectively to receive the screws 16 and 19. Nuts 16' and 19' are provided for holding the link 22 in place. The aforesaid apertures 23 and 24 are preferably in the form of open notches as shown in order that the link may be removed or replaced by merely loosening the nuts and not entirely removing them. For convenience in manipulation, the link 22 is preferably provided with a handle 25 of insulating material.

It will be observed that when the link 22 is in place, a circuit is established from the terminal 13 through the switch, through the fuse and through the conductors 14, 22 and 18 to the wire terminal 21 and thence to the meter.

Also mounted at the front of the base and on the said side surface thereof are conductor elements 26 and 27, the former being held by screws 28 and 29 and the latter by screws 30, 31 and 32. Connected with the conductor element 26 and preferably held by screw 28 is a wire receiving terminal 33 adapted to be connected with a wire leading from the meter at the load side thereof. Connected with the conductor element 27 and preferably held in place by the screw 32 is a wire receiving terminal 34 adapted to be connected directly with one of the load wires. For electrically connecting the conductor element 26 with the conductor element 27, there is provided a removable link 35 which is, or may be, exactly the same in construction as the link 22 already described. This link is held in place by means of nuts 29' and 31' on the screws 29 and 31 respectively.

In order that the conductors 14 and 27 may be directly connected with each other when desired for purposes of by-passing the meter, the said screws 17 and 30 are so arranged and so related to each other as to be adapted to receive a connecting link 36 which is, or may be, exactly the same in construction as the links 22 and 35, already described. The position of the link 36 when used is indicated in dot and dash lines in Figs. 1 and 4.

For a three-wire circuit, the parts as already described in detail are duplicated at the other side of the base and there is also provided a suitable neutral conductor 37. As shown, this neutral conductor extends vertically being arranged at the back of the base and opposite that portion of the front of the base which is occupied by the fuse contacts. The neutral conductor 37 is provided at its lower and upper ends respectively with wire receiving terminals 38 and 39.

Electrically connected with the wire receiving terminals 21, 21 and 33, 33 are auxiliary test contacts 40 and 41 adapted to be engaged by suitable conductors such as are used for meter testing purposes. Similar test contacts may be provided in conjunction with the terminals 34, 34, 38 and 39. The test contacts as shown do not of themselves constitute a part of the present invention, these being set forth in my patent for Test contact, No. 1,651,554 issued December 6, 1927, and in my patent for Wire connecting lug with test contact, No. 1,739,262 issued December 10, 1929.

When the appliance is to be used in conjunction with a six terminal meter, additional wire connecting terminals 42, 42 may be provided for connection with the separate potential coil terminals of the meter. These wire receiving terminals 42 when provided are connected with the switch contacts 5. The said terminals 42, 42, while shown, do not of themselves constitute a part of the present invention and they may be omitted if desired.

In Fig. 6, I have shown a diagram of electrical connections for a three-wire circuit. This diagram shows the three incoming service wires S connected respectively with the wire receiving terminals 13, 13 and 38 at the lower edge of the base. The wire receiving terminals 21, 21 are connected with wires $C^1$ and $C^2$ leading to the meter M at the service side thereof. Leading from the meter M at the load side thereof are wires $C^3$ and $C^4$ which are connected respectively with the terminals 33, 33. The load wires L are connected respectively with the terminals 34, 34 and 39. As already stated, the circuit normally extends through the switches and the fuses and through the removable links 22, 22 to the meter, and the circuit extends from the meter through the removable links 35, 35 to the load wires. When the meter is to be tested, the meter testing facilities already described are utilized. The links 36, 36 are put in place as already described, thus providing connections directly from the fuses to the load wires and by-passing the meter. After the links 36, 36 are in place, the links 35, 35 or the links 22, 22 or all of the said links can be removed to partly or entirely disconnect the meter from the load and service wires. Then the necessary meter connections can be made by means of the test contacts 40 and 41 in accordance with established meter testing practice.

The connections for a two-wire circuit are shown in Fig. 7. The neutral conductor can be omitted or not used and the conductor elements 26 and 27 with associated parts can be omitted or not used. The connections at the left hand side of the device are exactly the same as already described in connection with Fig. 6. The connections at the right differ in that all test links are omitted and in that the corresponding load wire is connected directly with the meter. A by-pass connection to cut out the meter is established by the use of a single link 36 at the left hand side and the meter can be disconnected by removing the links 35 and 22 at the left hand side.

In Figs. 8 and 9, I have shown a construction which is somewhat different in mechanical details from that already described, but which is identical as concerns the electrical connections. Instead of providing a conductor element 27 entirely at the front of the base, I have shown a conductor element 27ª which has its ends at the front of the base but which has its intermediate portion bent to lie rearward from the front of the base, thus permitting the base to be formed with a baffle 43. As shown, the conducting element 27ª is held at its upper end by means of a screw 30ª which extends through a strip 44 of insulating material, which strip lies in a groove in the base and is held by a screw 17ª. The conductor element 27ª is held at its lower end by means of a screw 32ª. The base is open at the rear to permit the insertion of the element 27ª from the rear, the said space being afterwards closed with sealing wax as shown.

Carried by the base at the front thereof is a conductor element 26ª which is held by means of screws 28ª and 29ª. The conductor elements 26ª and 27ª are normally connected by means of a removable link 35ª which is held by the nuts on the screws 29ª and 32ª. The link 35ª is or may be the same in construction as the link 22 already described.

In order that a by-pass connection may be established between the conductor 14 and the conductor 27ª, the said screws 17ª and 30ª are so arranged and located as to be adapted to receive a link 36ª which may be held by nuts on the said screws.

The construction shown in Figs. 8 and 9 may be used in the same way as that already described and repetition will be unnecessary.

I have shown two arrangements of testing facilities, but it will be understood that still other arrangements may be provided within the scope of the invention. Particularly it will be understood that an arrangement may be provided wherein the two links respectively connected ahead of and after the meter are parallel with each other.

As already stated, an appliance embodying the invention may be and preferably is enclosed in a cabinet and a suitable cabinet 45 is shown in Figs. 10 and 11. This cabinet is preferably arranged to be protectively associated with the meter M and as shown the upper end wall 46 of the cabinet is provided with an opening through which the terminal chamber portion of the meter projects. The cabinet is provided with an openable front cover 47 which is shown as being hinged at the bottom. The cover may be sealed in closed position as for instance by means of a seal 48 and when the cover is closed and sealed the cabinet serves not only to protect the appliance therein but it also serves to enclose and protect the terminal portions of the meter M and all of the connections between the meter and the appliance.

In order that the switch may be operated from the exterior of the cabinet, there is provided a suitable operating means which includes a handle 49 on the exterior of the cabinet. The operating means as shown and as preferred comprises a single wire or rod bent to form the said handle 49 and also to form a crank portion 50 within the cabinet. At the ends of the crank portion 50 are suitable bearing portions 51 and 52 which extend through bearing apertures in the side walls of the cabinet. Each of the switch blades 8 is provided with an insulating operating element 53 having a slot 54 for receiving the crank portion 50 of the operating spindle. It will be seen that when the handle 49 is moved to oscillate the crank portion 50, the switch blades will be moved through the medium of the elements 53 into or out of closed positions.

It is sometimes desirable to make provision for permitting access to the fuses and fuse contacts even when the cover of the cabinet is closed to prevent access to the other parts in the cabinet and it may further be desirable to provide means for preventing access to the fuses and fuse contacts through the said opening except when the switch is in its open position. In Figs. 10 and 11 of the drawings, I have shown the cover 47 as provided with an opening 55 into which the fuse carrying portion of the base 1 projects. This portion of the base serves to substantially close the opening 55 so that access cannot be had through this opening to any other parts within the cabinet. The cover 47 is shown as carrying a housing 56 having an opening 57 therein, which closely registers with the opening 55 in the cover. Carried by the housing 56 is a suitable cover 58 which is adapted to entirely close the opening 57 as clearly shown in Fig. 10. The cover 58 is so formed adjacent the handle 49 that it is obstructed by the handle when the latter is in the position corresponding to the closed position of the switch, as shown in Figs. 10 and 11. A reference to these figures shows that with the parts in the positions shown, the cover 58 cannot be moved to the right to uncover the opening 57. The construction is such, however, that when the switch handle 49 is moved downward into the position corresponding to the open position of the switch, it lies below the path of movement of the cover 58, the cover then being free to be moved to the right to uncover the opening 57 and to permit access to the fuses. It will be observed, however, that when the cover is in its right hand open position, it obstructs the switch handle 49, thus preventing the switch handle from being moved to close the switch.

The construction which I have herein shown for preventing access to the fuses when the switch is closed and for preventing closing of the switch when the fuse cover is in its open position does not constitute a part of the present invention, this being disclosed and claimed in my patents for Enclosed fused switches, No. 1,721,493, No. 1,721,494, and No. 1,721,495 all issued July 16, 1929.

What I claim is:

1. An electric meter service appliance comprising in combination, insulating carrying means supported in normally fixed spaced relationship with a rear supporting wall, a pair of fuse receiving contacts at the front of the said insulating carrying means, a switch connected with the said insulating carrying means and located between the plane of the rear face thereof and the said supporting wall, means for electrically connecting the said switch in series with the said fuse contacts, meter testing facilities mounted on the front of the said insulating carrying means and transversely spaced from any part of the said fuse contacts, the said meter testing facilities including two links manually operable independently of each other, means for electrically connecting one of the said links in series with the said fuse contacts and switch and with the meter at the service side of the latter, and other means for electrically connecting the other of the said links between the load side of the meter and a load wire.

2. An electric meter service appliance comprising in combination, insulating carrying means supported in normally fixed spaced relationship with a rear supporting wall, a pair of fuse receiving contacts at the front of the said insulating carrying means, a switch connected with the said insulating carrying means and located between the plane of the rear face thereof and the said supporting wall, means for electrically connecting the said switch in series with the said fuse contacts, meter testing facilities mounted on the front of the said insulating carrying means and transversely spaced from any part of the said fuse contacts, the said meter testing facilities including two links manually operable independently of each other and also including elements for the attachment of a by-pass member in electrical connection with the two links, means for electrically connecting one of the said links in series with the said fuse contacts and switch and with the meter at the service side of the latter, and other means for electrically connecting the other of the said links between the load side of the meter and a load wire.

3. An electric meter service appliance comprising in combination, a unitary insulating base supported in normally fixed spaced relationship with a rear supporting wall, a pair of fuse receiving contacts on the front of the said base, a switch connected with the said base and located between the plane of the rear face thereof and the said supporting wall, means for electrically connecting the said switch in series with the said fuse contacts, meter testing facilities mounted on the front of the said insulating base and transversely spaced from any part of the said fuse contacts, the said meter testing facilities including two links manually operable independently of each other, means for electrically connecting one of the said links in series with the said fuse contacts and switch and with the meter at the service side of the latter, and other means for electrically connecting the other of the said links between the load side of the meter and a load wire.

4. An electric meter service appliance comprising in combination, a unitary insulating base supported in normally fixed spaced relationship with a rear supporting wall, a pair of fuse receiving contacts on the front of the said base, a switch connected with the said base and located between the plane of the rear face thereof and the said supporting wall, means for electrically connecting the said switch in series with the said fuse contacts, meter testing facilities mounted on the front of the said insulating base and transversely spaced from any part of the said fuse contacts, the said meter testing facilities including two links manually operable independently of each other, a transverse conductor located at least in part in a recess at the back of the base and serving to electrically connect one fuse contact with one of the said links means for connecting the said switch, the said fuse contacts and the last said link in series with the meter at the service side thereof, and other means for electrically connecting the other of the said links between the load side of the meter and a load wire.

JOSEPH SACHS.